United States Patent
Teraoka et al.

[11] Patent Number: 5,868,643
[45] Date of Patent: Feb. 9, 1999

[54] DIFFERENTIAL APPARATUS

[75] Inventors: Masao Teraoka; Satoshi Aiba; Kenji Hiraishi, all of Tochigi-ken, Japan

[73] Assignee: Tochigi Fuji Sangyo Kabushiki Kaisha, Japan

[21] Appl. No.: 542,934

[22] Filed: Oct. 13, 1995

[30] Foreign Application Priority Data

Oct. 14, 1994 [JP] Japan .................................. 6-249708

[51] Int. Cl.$^6$ ............................................. B60K 17/20
[52] U.S. Cl. ........................ 475/252; 475/249; 475/344; 74/462
[58] Field of Search ..................................... 475/248, 249, 475/252, 344; 74/460, 461, 462

[56] References Cited

U.S. PATENT DOCUMENTS

| | | | |
|---|---|---|---|
| 1,506,918 | 9/1924 | Soden-Frauhofen | ....................... 74/462 |
| 3,180,172 | 4/1965 | Leggatt | ....................... 74/462 |
| 4,942,781 | 7/1990 | Hori | ....................... 74/462 X |

FOREIGN PATENT DOCUMENTS

| | | | |
|---|---|---|---|
| 6-117503 | 4/1994 | Japan | ....................... 475/344 |
| 898340 | 10/1958 | United Kingdom | ....................... 74/462 |

*Primary Examiner*—Khoi Q. Ta
*Attorney, Agent, or Firm*—Jones & Askew

[57] ABSTRACT

A differential apparatus includes a differential casing, a pair of side gears and plural pairs of pinion gears. The pinion gears are accommodated in bores formed in the differential casing, respectively. Each pinion gear has an outer diameter smaller than that of a standard gear to be determined corresponding to predetermined gear specifications. With such a forming of the pinion gears, the tip circular thickness of each pinion gear is increased, so that surface pressure at respective tips of the pinion gears is reduced to improve the seizure resistant capability.

10 Claims, 4 Drawing Sheets

FIG.5

| PINION GEAR | H (mm) | S (mm) | S/H (%) | NUMBER OF TEETH | EXISTENCE OF SEIZURE |
|---|---|---|---|---|---|
| a | 4.1 | 3.5 | 85 | 7 | NOT OCCURRED |
| b | 4.8 | 2.2 | 46 | 6 | NOT OCCURRED |
| c | 4.4 | 2.4 | 55 | 6 | NOT OCCURRED |
| d | 4.4 | 2.6 | 59 | 7 | NOT OCCURRED |

DIFFERENTIAL APPARATUS

BACKGROUND OF THE INVENTION

1. Technical Field

The present invention relates to a differential apparatus used for a vehicle or the like and more particularly, it relates to a mechanism for limiting differential operations of the differential apparatus.

2. Description of the Related Art

Such a differential apparatus provided with a differential limiting mechanism can be found in the publication, Japanese Patent Publication (Kokai) No. 63-76938. The differential apparatus includes a differential casing driven by an engine through a drive gear and a ring gear. About an axis of the differential casing, two opposing (left and right) helical side gears are arranged coaxially with the axis. In the differential casing, two pairs of bores are formed outside of the side gears to run parallel with the axis of the differential casing. In these bores, helical pinion gears with six teeth are rotatably accommodated, respectively. Each of the helical pinion gears consists of an axial outside portion engaging with each side gear and an axial inside portion engaging with an axial inside portion of the other pinion gear. Consequently, the side gears are associated with each other through the helical pinion gears. Note, in the differential apparatus, a spacer is disposed between the side gears, provided on a periphery thereof with arc recesses opposing the bores, respectively.

The above-mentioned differential limiting mechanism of the apparatus operates as follows.

When there is produced a difference in driving resistance between the right and left side gears, driving force transmitted from the engine is divided into the side gears differently by the rotations of the pinion gears. Then, each pinion gear is forced against the cylindrical inner wall of the bore and the arc recess of the spacer by the meshing reaction of the pinion gear with the other pinion gear, so that a frictional resistance is produced. Furthermore, by thrust forces caused by the meshing operations of these helical gears, i.e., the side gears and the pinion gears, another frictional resistance is generated between the respective helical gears and the differential casing including the spacer. In this way, a differential limiting force can be obtained by these frictional resistances.

In connection with the above-mentioned differential limiting mechanism, a method of increasing the differential limiting force is also known. In this method, owing to the meshing reaction of the side gears with the pinion gears, which is caused by keeping a portion of each side gear rotatably supported by the differential casing in a free-fitting condition, the tip surfaces of the side gear are urged against the cylindrical wall of the differential casing thereby to produce the frictional resistance.

In the differential apparatus mentioned above, however, the helical side gears and the helical pinion gears are selected in accordance with a "gear-standard" defining basic gear specifications. For example, it is noted that, on general conditions of six in number of teeth, 20° in pressure angle and 2.25 module in tooth length, a tip circular thickness of the pinion gears is established to be around 20 percent of a tooth length thereof.

Therefore, if the pinion gear having such a tip circular thickness is slid and rotated in the bore formed in the differential casing in order to obtain the differential limiting force, there would be raised a problem that surface pressure of the pinion gear is excessive to cause a seizure phenomenon because of an insufficiency of the tip circular thickness.

In order to reduce the surface pressure of the pinion gear, it may be thought that a diameter of each bore of the differential casing is increased while a number of teeth of the pinion gear is increased to be seven or eight, which would be around 22 percent and 24 percent in tip circular thickness, respectively, on the same conditions as above. In either of the cases, however, there is still remained a problem of "seizure phenomenon" between the tip surfaces of the pinion gears and the bores, so that the apparatus would be large-sized.

Also in the side gears of the differential apparatus where the differential limiting force is increased by frictionally rotating the side gears in the differential casing, there is still remained a problem of increasing the surface pressure of the side gears thereby causing the seizure.

SUMMARY OF THE INVENTION

It is therefore an object of the present invention to provide a differential apparatus which is capable of improving the seizure resistant capability of respective sliding tips of gears installed in the differential apparatus.

The object of the invention described above can be accomplished by a differential apparatus comprising:
- a differential casing rotated by a driving force of an engine;
- a pair of side gears arranged in the differential casing, opposing to each other and rotatably supported coaxially with an axis of the differential casing;
- plural pairs of bores formed about the side gears in the differential casing so as to extend in parallel with the axis of the differential casing; and
- plural pairs of pinion gears respectively accommodated in the bores to rotate and slide therein, the pinion gears meshing with the output side gears respectively and meshing with each other,
- wherein each of the pinion gears has an outer diameter smaller than that of a standard gear to be determined corresponding to predetermined gear specifications so that a tip circular thickness of the pinion gear is increased in comparison with that of the standard gear.

With the arrangement mentioned above, when a difference in driving resistance is produced between the pair of side gears, a driving force transmitted from the engine is divided into the side gears differently by the rotations of the pinion gears and then the differential limiting effect is obtained by frictional forces produced by respective sliding movements of the pinion gears and the side gears in the differential casing. According to the invention, since the tip circular thickness of each pinion gear is so increased as to enlarge the sliding area on the inner wall of the bore, it is possible to reduce surface pressure at each tip of the pinion gear, whereby the seizure resistant capability of the pinion gears can be improved.

In the present invention, preferably, the side gears are rotatably supported in the differential casing and each of the side gears has an outer diameter smaller than that of a standard gear to be determined corresponding to predetermined gear specifications so that a tip circular thickness of the side gear is increased in comparison with that of the standard gear.

Also in this case, since the tip circular thickness of each side gear is increased, it is possible to reduce surface pressure at each tip of the side gear, whereby the seizure resistant capability of the side gears can be improved.

In detail, if the number of teeth of the pinion gear is six, it is preferable that the tip circular thickness of each of the pinion gears is about 40 percent to 60 percent of the tooth depth Alternatively, if the number of teeth of the pinion gear is seven, it is preferable that the tip circular thickness of each of the pinion gears is about 55 percent to 90 percent of the tooth depth.

Furthermore, according to the present invention, there is also provided a method of manufacturing a differential apparatus comprising a differential casing, a pair of side gears arranged in the differential casing and plural pairs of pinion gears rotatably accommodated in bores formed in the differential casing so as to mesh with either one of the side gears and to mesh with each other, the method comprising steps of:

preparing materials of the pinion gears and/or the side gears;

forming a periphery of each of the material so that an outer diameter thereof is smaller than that of a standard gear to be determined corresponding to predetermined gear specifications; and thereafter, gear-cutting each of the materials in so as to meet with the predetermined gear specifications.

In such a case, since the outer peripheries of the materials are formed smaller in advance to the gear-cutting step, the processing cost can be saved.

These and other objects and features of the present invention will become more fully apparent from the following description and appended claims taken in conjunction with the accompanying drawings.

BRIEF DESCRIPTION OF THE DRAWING

FIG. 5 is a diagram showing results of seizure resistant test of the pinion gear of the differential apparatus in accordance with the embodiment of the present invention.

DESCRIPTION OF THE PREFERRED EMBODIMENT

Figure 1:
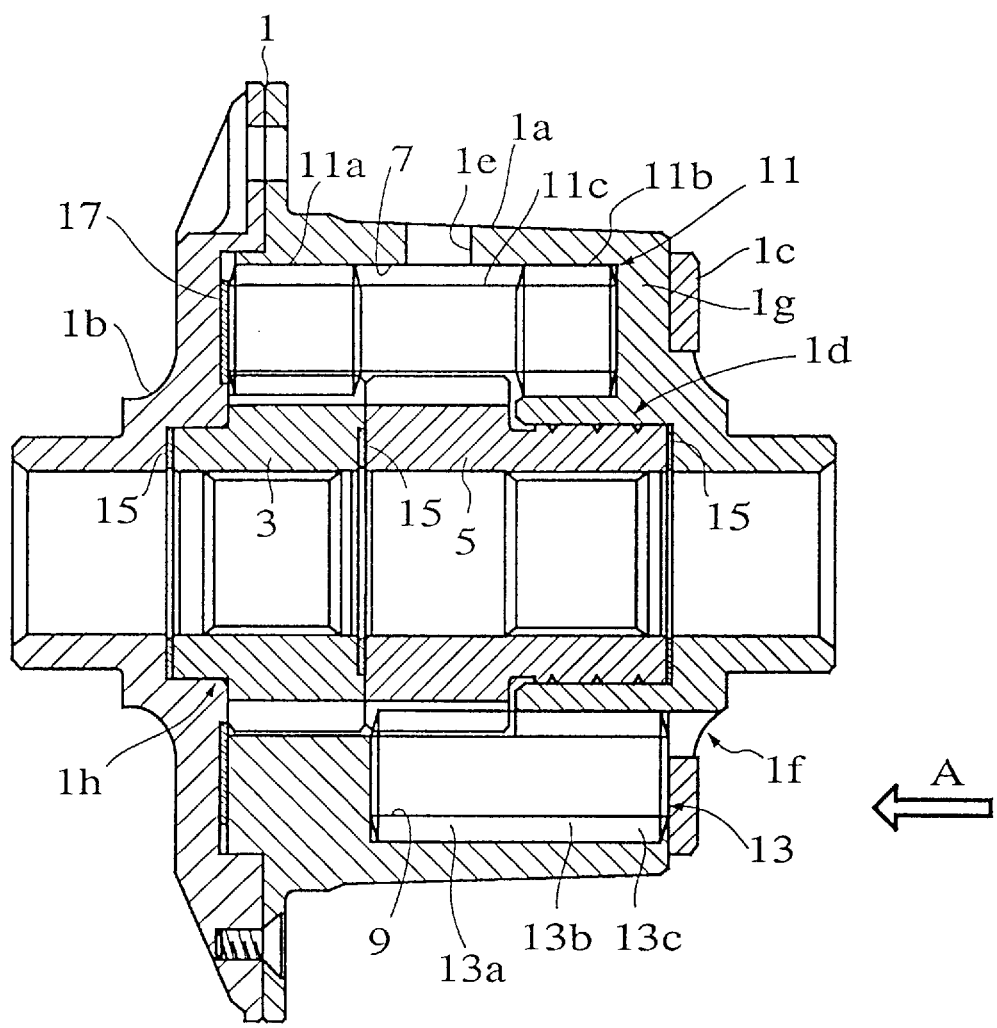
FIG. 1 is a longitudinal cross-sectional view of a differential apparatus in accordance with an embodiment of the present invention.
Figure 2:
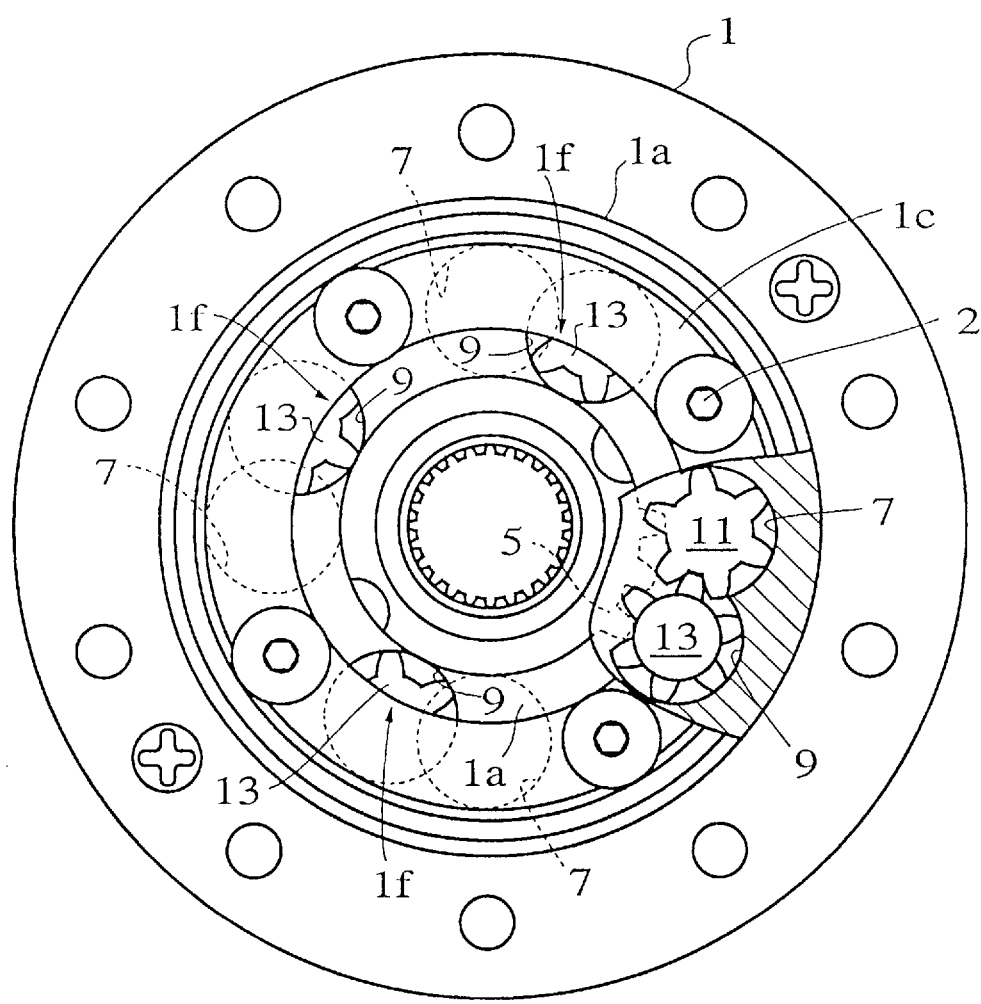
FIG. 2 is a side view of the differential apparatus, taken along arrow A of FIG. 1.
Figure 3:
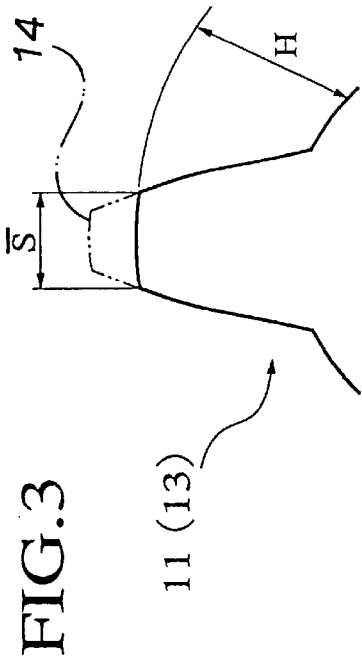
FIG. 3 is an explanatory view showing a part of the pinion gear of the differential apparatus of FIG. 1.
Figure 4:
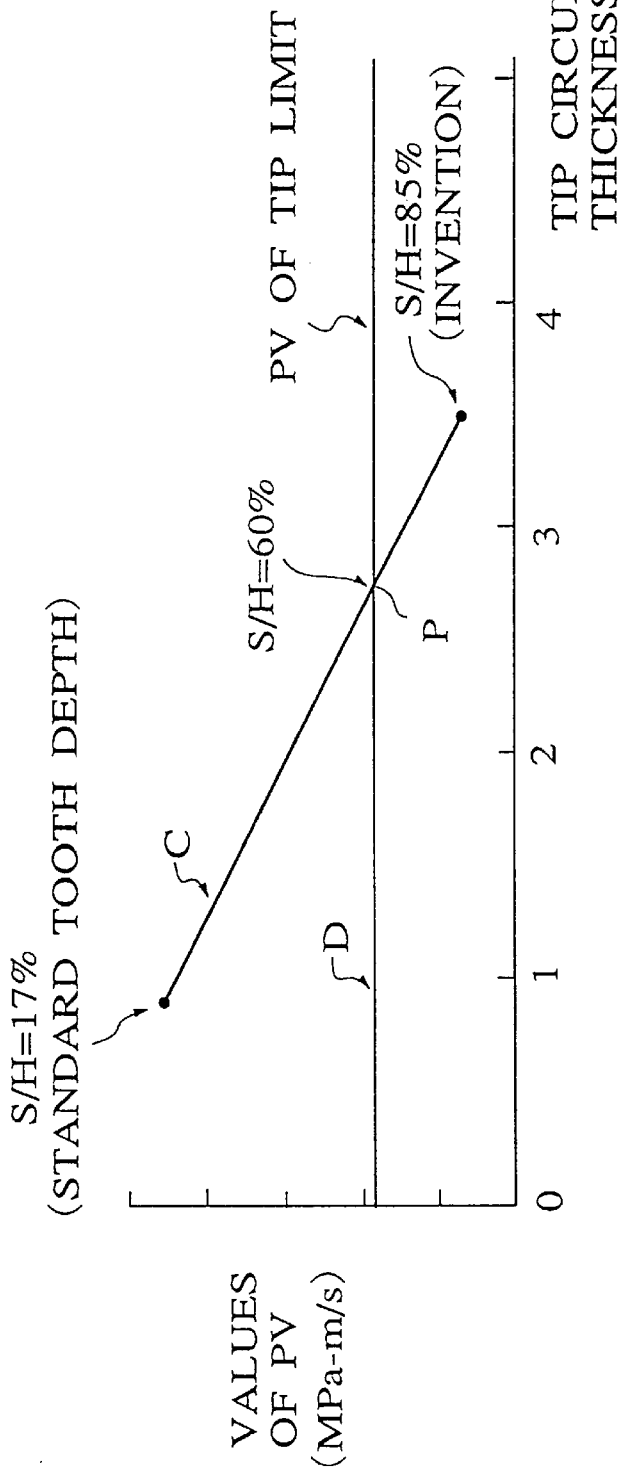
FIG. 4 is a diagram showing a relationship between tip circular thickness of gear and values of PV.

FIGS. 1 and 2 show a differential apparatus in accordance with one embodiment of the present invention, which is applied for a drive shaft of a vehicle. Further, FIGS. 3 and 4 are explanatory diagrams of the apparatus.

As shown in FIG. 1, this differential apparatus consists of a differential casing 1, helical side gears 3, 5 and helical pinion gears 11, 13. The whole apparatus is rotatably arranged in a not-shown differential carrier with lubricating oil reservoir, so that meshing and sliding sections of the gears etc. are lubricated.

The differential casing 1 consists of a hollow casing body 1a with an opening on a left side thereof in the figure and a side wall 1g on the right side, a cover 1b fixed to the casing body 1a to close the opening, and an annular plate 1c fixed to the side wall 1g. The casing 1 is rotated about an axis by the engine through a not-shown power transmission device. The casing body 1a is provided with hollow sections 1d, 1h in which two opposing side gears 3, 5 on an output side are rotatably supported, respectively. The outer periphery (addendum diameter) of the side gears 3, 5 are freely fitted in the differential casing 1 so as not to slide axially. Also in the differential casing 1, four pairs of bores 7, 9 for accommodating the pinion gears are formed around the hollow sections 1d, 1h at intervals in the circumferential direction so as to be in parallel with the center axis of the differential casing 1. The casing body 1a is provided with an opening if which is arranged among an orifice 1e for lubrication, the bore 9 and the annular plate 1c. This plate 1c is fixed to the side wall 1g of the differential casing 1 through the intermediary of bolts 2, as shown in FIG. 2.

Inside the hollow side gears 3, 5, not-shown left and right drive shafts are inserted and connected thereto, respectively, so that the power of the engine is transmitted to the left and right drive shafts through the left and right side gears 3, 5. Washers 15 are arranged between the side gears 3 and 5 and between the side gears 3, 5 and the differential casing 1, respectively.

The pinion gear 11 consists of a gear section 11a in mesh with the left side gear 3, another gear section 11b and an axle section 11c for connecting the gear section 11a with the gear section 11b. The gear 11 is accommodated in the bore 7 of the casing body 1a so as to rotate and slide therein. Disposed between the gear section 11a and the cover 1b is a washer 17 which serves to limit the axial movement of the pinion gear 11 together with a bottom face of the bore 7.

The pinion gear 13 is slidably and rotatably accommodated in the bore 9 of the casing body 1a so that a gear section 13a meshes with the right side gear 5 and the other gear section 13b meshes with the gear section 11b of the other pinion gear 11. In this way, the side gears 3 and 5 are connected with each other.

The pinion gear 13 further comprises an extending gear section 13c which extends to the right in FIG. 1 in succession with the gear section 13b and of which periphery is supported by a wall defining the bore 9. It is noted that the axial movement of the pinion gear 13 is limited by the bottom face of the bore 9 and the plate 1c.

As representatively shown in FIG. 3, the outer diameters of the pinion gears 11, 13 are respectively established to be smaller than that of a standard gear 14 determined in accordance with required gear specifications such as modules, number of teeth, pressure angle or the like. With such an establishment, a tip circular thickness S is increased in comparison with the standard tip circular thickness determined corresponding to the outer diameter of the standard gear. Consequently, the tip circular thickness S is established to be of about 40 to 60 percent of the tooth length H in case that the number of teeth of the pinion gears 11, 13 are respectively six. Similarly, in case of respective seven teeth of the pinion gears 11, 13 the tip circular thickness S is established to be of about 40 to 60 percent of the tooth length H.

In order to attain the tip circular thickness S of such an optimum value as above, a material for the pinion gears 11, 13 is shaped so as to be of smaller diameter in advance before gear cutting. In a modification, however, it may be applicable to cut the outer periphery of the standard gear 14 to be of small diameter after gear cutting. Of course, each of the bores 7, 9 is formed to have a diameter corresponding to the resulting outer diameter (tip diameter) of the pinion gears 11 and 13. The pinion gears 11, 13 are provided at respective tips thereof with chamfers (semi-topping). Although, in the embodiment, knurling process is applied to keep the lubricating oil at the surface of the tips, each of the pinion gears 11, 13 is also adapted so that the tip circular thickness S of the gear after being chamfered is included in the above range.

The differential apparatus mentioned above operates as follows.

In process of transmitting the driving force from the engine, if there is no difference in driving resistance between the side gears 3 and 5, they rotates integrally with the differential casing 1. On the contrary, if there is produced the difference in driving resistance therebetween, the driving force is divided into the side gears differently by the rotations of the pinion gears 11, 13. During this differential rotations of the side gears 3, 5, the pinion gears 11, 13 are respectively forced against inner walls of the bores 7, 9, by the meshing reaction with each other, so that the frictional resistance is produced between the gears 11, 13 and the bores 7, 9, respectively. Simultaneously, owing to meshing thrust forces of the helical gears 11, 13, 3, 5, the frictional resistances are produced among the washer 17, the plate 1c and the bottom faces of the bores 7, 9 and also produced between the side gears 3, 5 and the washer 15. The differential limiting force of the differential apparatus is obtained by the above frictional resistances. Note that, owing to the rotation of the extending gear section 13c during the differential rotation, there is produced a pumping effect in the bore 9, so that the lubricating oil flows out through the opening 1f.

Then, since the tip circular thicknesses S of the pinion gears 11, 13 which rotate in the bores 7, 9, sliding on the inner walls, are established to be larger as mentioned above, values of PV Mpa·m/s (pressure velocity) at the sliding portions of the gears 11, 13 are decreased so that the seizure is hardly caused.

FIG. 4 shows a relationship between the tip circular thickness of the gear having seven teeth and the values of PV. In the figure, a line of C shows a relationship between the tip circular thickness and the values of PV in case of changing the values of S/H from 17 percent through 85 percent. A horizontal line of D shows a so-called "tip limitative" value of PV" above which the seizure at the tip would be caused. The line of C intersects with the line of D at a point P of 60 percent in S/H. It will be understood that on conditions over 60 percent in S/H, the seizure is hard to be caused, while the seizure is easy to be caused on conditions less than 60 percent in S/H.

FIG. 5 shows experimental results supporting the above-mentioned character, which are the results of seizure resistant test at the sliding portions of the differential apparatus installed with the pinion gears of the ratio S/H as a variable. It will be understood that no seizure is caused at the sliding portions in all cases shown in the figure.

According to the embodiment, by forming the outer diameters of the pinion gears 11, 13 smaller, the tip circular thicknesses S can be increased, so that each ratio of the thickness S to the tooth length H is established to be the above optimum value. Consequently, the values PV at the tip sliding portions of the pinion gears 11, 13 can be decreased thereby to improve the seizure resistance capability.

Furthermore, corresponding to the forming of the smaller outer diameter, the pinion gears 11, 13 are miniaturized, so that the bending strengths of the whole gears and teeth thereof can be improved respectively. In addition, the casing body 1a can be miniaturized.

In the embodiment, since the outer diameters of the materials of the pinion gears 11, 13 are formed smaller in advance before gear cutting, the processing cost can be saved. Note that, in this embodiment, the side gears 3, 5 are supported in the hollow sections 1d, 1h of the differential casing 1, so that the tips of the gears do not slide. This is because it is intended to prevent a reduction of contact ratio between the pinion gears 11, 13 and the side gears 3, 5 due to the reductions in tooth length H of the gears 11, 13 and to slidably contact four pairs of pinion gears with the bores 7, 11 of the differential casing 1 equally by constructing the side gears 3, 5 so as to move radially a little.

Therefore, as a modification, if the side gears 3, 5 are not supported in the hollow sections 1d, 1h but the tips thereof are supported in the differential casing 1 so as to slide therein, the differential limiting force is added by the frictional force of the side gears 3, 5 at the respective tips. In such a case, by making the outer diameters of the side gears 3, 5 smaller thereby to increase their tip circular thicknesses, it is possible to reduce the values of PV at the respective tips of the side gears 3, 5, whereby the seizure resistance can be improved. Further, owing to the reduced outer diameter of the side gear 5, it is possible to increase a diameter of the axle section 11c of the pinion gear 11, which corresponds to the reduced diametrical section of the side gear 5 in the axial direction, so that the strength of the pinion gear 11 can be improved. In addition, it is possible to miniaturize the differential casing 1.

It is to be understood that the preferred embodiment disclosed therein is by way of example only and is not intended to impose limitations on the present invention, reference being had for this purpose to the claims which follow.

What is claimed is:

1. A differential apparatus comprising:
   a differential casing rotated by a driving force of an engine;
   a pair of side gears arranged in said differential casing, opposing to each other and rotatably supported coaxially with an axis of said differential casing;
   plural pairs of bores formed about said side gears in said differential casing so as to extend in parallel with the axis of said differential casing; and
   plural pairs of pinion gears respectively accommodated in said bores to rotate and slide therein, said pinion gears meshing with said side gears respectively and meshing with each other,
   wherein each of said pinion gears has an outer diameter, smaller than that of a standard gear, to be determined corresponding to predetermined gear specifications so that a tip circular thickness of said pinion gear is increased in comparison with that of said standard gear.

2. A differential apparatus as claimed in claim 1, wherein said side gears are rotatably supported in said differential casing and wherein each of said side gears has an outer diameter, smaller than that of a standard gear, to be determined corresponding to predetermined gear specifications so that a tip circular thickness of said side gear is increased in comparison with that of said standard gear.

3. A differential apparatus as claimed in claim 1 or 2, wherein the tip circular thickness of each of said pinion gears is about 40 percent to 60 percent of the tooth depth in case that the number of teeth is six.

4. A differential apparatus as claimed in claim 1 or 2, wherein the tip circular thickness of each of said pinion gears is about 55 percent to 90 percent of the tooth depth in case that the number of teeth is seven.

5. A differential apparatus as claimed in claim 1 or 2, further comprising a plurality of washers disposed between the side gear and the other side gear, between the side gears and the differential casing.

6. A differential apparatus as claimed in claim 5, wherein said differential casing comprises a cylindrical casing body, a cover fixed to an axial end of said cylindrical casing body for closing it and an annular plate fixed to another axial end of said cylindrical casing body.

7. A differential apparatus as claimed in claim 6, further comprising an additional washer disposed between said pinion gears and said cover.

8. A differential apparatus as claimed in claim 7, wherein said casing body is provided with an orifices for lubrication.

9. A differential apparatus as claimed in claim 8, wherein one of each pair of said pinion gears consists of a first gear section meshing with one of said side gear, a second gear section meshing with the other pinion gear and a third gear section supported over its full periphery by one of said bores.

10. A differential apparatus as claimed in claim 9, wherein said orifice is arranged in a vicinity of said third gear section.

* * * * *